United States Patent
Sakai

(10) Patent No.: US 7,422,421 B2
(45) Date of Patent: Sep. 9, 2008

(54) PLUNGER PUMP APPARATUS

(75) Inventor: Koji Sakai, Nagano (JP)

(73) Assignee: Nissin Kogyo Co., Ltd., Nagano-Ken (JP)

( * ) Notice: Subject to any disclaimer, the term of this patent is extended or adjusted under 35 U.S.C. 154(b) by 473 days.

(21) Appl. No.: 11/297,355

(22) Filed: Dec. 9, 2005

(65) Prior Publication Data

US 2006/0127234 A1    Jun. 15, 2006

(30) Foreign Application Priority Data

Dec. 10, 2004 (JP) ............................. 2004-357759
Dec. 10, 2004 (JP) ............................. 2004-357760

(51) Int. Cl.
*F04B 27/04* (2006.01)

(52) U.S. Cl. ..................... 417/273; 92/86; 303/116.4; 277/514

(58) Field of Classification Search ................. 417/273; 92/86; 277/514; 303/10, 70, 116.4; 415/108
See application file for complete search history.

(56) References Cited

U.S. PATENT DOCUMENTS

| 3,943,717 | A | * | 3/1976 | Schexnayder | ................ | 60/453 |
| 4,966,530 | A | | 10/1990 | McCusker et al. | | |
| 5,839,349 | A | | 11/1998 | Volz | | |
| 6,142,751 | A | * | 11/2000 | Krauter et al. | ............... | 417/415 |
| 6,389,955 | B1 | * | 5/2002 | Schaefer | ........................ | 92/86 |
| 6,598,512 | B2 | * | 7/2003 | Siegel | ............................ | 92/83 |
| 7,121,635 | B2 | * | 10/2006 | Kondo | ..................... | 303/119.3 |
| 2002/0140284 | A1 | * | 10/2002 | Koyama et al. | .......... | 303/116.4 |

FOREIGN PATENT DOCUMENTS

| EP | 0770530 A3 | 5/1997 |
| JP | A-1-290977 | 11/1989 |
| JP | A-2-249749 | 10/1990 |
| JP | 11-334565 A | 12/1999 |
| JP | 2000-52959 A | 2/2000 |

* cited by examiner

*Primary Examiner*—Devon Kramer
*Assistant Examiner*—Amene S Bayou
(74) *Attorney, Agent, or Firm*—Greenblum & Bernstein, P.L.C.

(57) ABSTRACT

A reservoir chamber 33, which communicates with a vent passage 34 provided in an electric motor 11, is formed between a motor casing 20 of the electric motor 11 and a body 13 in which a drain port 59A, which communicates with the reservoir chamber 33, is provided with its external open end oriented downwardly, and a capacity of the reservoir chamber 33 below the vent passage 34 is set to become larger than a sum of a cooling contraction amount of air in the electric motor 11 and the reservoir chamber 33 which contracts in response to cooling by water covering the pump apparatus which has been warmed up under an operating environment and a pressurizing compression amount of air in the electric motor 11 and the reservoir chamber 33 which is compressed by a water pressure applied from the drain, port 59A when the pump apparatus is submerged.

7 Claims, 7 Drawing Sheets

PLUNGER PUMP APPARATUS

The present invention claims foreign priority to Japanese patent applications No. JP.2004-357759 and No. JP.2004-357760, both of which were filed on Dec. 10, 2004, the contents to which are incorporated herein by references.

BACKGROUND OF THE INVENTION

1. Field of the Invention

The present invention relates a plunger pump apparatus including a pump having a plunger reciprocated by an eccentric cam portion provided on a pump drive shaft and provided in a body and an electric motor provided on one side of the body in such a manner as to drive to rotate the pump drive shaft.

2. Description of the Background Art

There is known in Japanese Patent Unexamined Publication No. JP-A-1-290977, a plunger pump apparatus in which as a venting measure for the electric motor in the plunger pump apparatus as described above, a grommet is held between a motor casing of the electric motor and the body, and a vent passage is provided in the grommet which establishes a communication between the inside of the electric motor and the outside.

Incidentally, in the conventional plunger pump apparatus, a change in volume of air due to a change in temperature is not taken into consideration. Namely, when the pump apparatus, which is in a warmed up state due to operation, is submerged, air within the electric motor is caused to contract due to cooling in addition to the application of water pressure, and the amount of water penetrating into the electric motor from the vent passage at the time of the submergence is increased due to the contraction of air, resulting in a possibility that the inside of the electric motor is submerged.

There is also already known, for example, in Japanese Patent Unexamined Publication No. JP-A-2-249749, a plunger pump apparatus in which a needle baring, functioning as a bearing unit, is fitted on an eccentric cam portion of a pump drive shaft and a plunger is brought into sliding contact with the needle bearing at one end thereof.

Incidentally, when compared to ball bearings, needle bearings are high in production cost and tend to generate large vibration and loud noise, and hence, there have existed demands for ball bearings in place of the needle bearings in order to solve the problems inherent in the latter. On the other hand, in plunger pump apparatuss, it is desired that a sliding fitting portion of a plunger into a pump housing is made as diametrically small as possible while the stroke is extended from the viewpoint of efficiency and strength.

However, when a needle bearing is simply replaced with a single ball bearing, there is caused a problem with durability, and therefore, when a ball bearing is used, a plurality of ball bearings need to be arranged in parallel. In ball bearings of a size which can be fitted on the eccentric cam portion on the pump drive shaft, since a distance between balls of ball bearings of the plurality of ball bearings which lie at both ends of the ball bearing arrangement direction becomes relatively long, when one end portion of the plunger which is small in diameter is brought into direct abutment, with outer rings of the plurality of ball bearings, the end portion of the plunger abuts with outer surfaces of the outer rings inwards of balls of the ball bearings lying at both the ends of the ball bearing arrangement direction, and the outer rings of the ball bearings are inclined relative to the axis of the pump drive shaft, whereby there is caused a problem that the operation of the pump drive shaft at the eccentric cam portion becomes unstable. The problem becomes remarkable in a combination of the pair of ball bearings which are arranged in parallel and the plunger which is brought into abutment with the middle portion of the pair of ball bearings so arranged.

SUMMARY OF THE INVENTION

The invention was made in view of the situations, and one of objects thereof is to provide a plunger pump apparatus which can prevent the penetration of water into the electric motor at the time of submergence while enabling the venting of the electric motor, and also to provide a plunger pump apparatus which realizes a stable operation using a plunger whose sliding fitting portion into a pump housing is made as diametrically small as possible while suppressing vibration and noise to small levels using ball bearings and realizing a reduction in production cost.

In order to solve the problem, according to a first aspect of the present invention, there is provided a plunger pump apparatus comprising:

a body;

an electric motor mounted on one side of the body for rotating a pump drive shaft having an eccentric cam portion;

at least one of pumps provided in the body and having a plunger reciprocated by the eccentric cam portion;

a reservoir chamber formed between a motor casing of the electric motor and the body, and communicating with a vent passage provided in the electric motor to thereby communicate with an inside of the electric motor; and a drain port provided in the body having an external open end thereof oriented downwardly so as to communicate the reservoir chamber to an outside, wherein a capacity of the reservoir chamber below the vent passage is set to become larger than a sum of a cooling contraction amount of air in the electric motor and the reservoir chamber which contracts according to cooling by water covering the pump apparatus which has been warmed up under an operating environment and a pressurizing compression amount of air in the electric motor and the reservoir chamber which is compressed by a water pressure applied from the drain port when the pump apparatus is submerged.

According to a second aspect of the present invention, as set forth in the first aspect of the present invention, it is preferable that the pump drive shaft having a horizontal axis is connected to a rotational shaft of the electric motor coaxially so as not to rotate relative to the rotational shaft at a vertically intermediate portion of the reservoir chamber, and part of the vent passage is formed within a bearing which rotatably supports the rotational shaft on the motor casing.

According to a third aspect of the present invention, as set forth in the first aspect of the present invention, it is preferable that a suction chamber is formed between the body and the pump drive shaft so as to store operating fluid raised by the pump, an annular seal member which constitutes a seal between the suction chamber and the reservoir chamber is interposed between the pump drive shaft and the body in such a manner as to face the reservoir chamber, and the drain port is provided in the body at a position lying above a bottom surface of the reservoir chamber so as to communicate with the reservoir chamber.

According to a fourth aspect of the present invention, as set forth in the first aspect of the present invention, it is preferable that a motor adapter is held between the body and the motor casing so as to form a closed space at least either between the body and the motor adapter or between the motor casing and the motor adapter.

According to a fifth aspect of the present invention, as set forth in the first aspect of the present invention, it is preferable that the plunger pump apparatus further comprising a bearing unit fitted on an outer circumference of the eccentric cam portion, wherein the plunger sliding contacts with the bearing unit at one end portion thereof, and is fitted in a pump housing in such a manner as to reciprocate in a direction perpendicular to a rotational axis of the pump drive shaft, the bearing unit comprises a plurality of ball bearings arranged along with an arrangement direction defined to be parallel to the rotational direction of the pump drive shaft, and the plunger comprises:

a piston portion slidably fitted in the pump housing, and of which diameter being smaller than a ball distance defined between centers of balls of the ball bearings which are arranged at both ends in the arrangement direction; and a bearing abutment portion which is coaxially and continuously connected to the piston portion so as to sliding contact with outer rings of the respective ball bearings, wherein an abutment length defined between both ends of the bearing abutment portion in the arrangement direction is set larger than the ball distance.

According to a sixth aspect of the present invention, as set forth in the fifth aspect of the present invention, it is preferable that the bearing abutment portion is provided to integrally continue to the piston portion.

According to a seventh aspect of the present invention, as set forth in the first aspect of the present invention, it is preferable that the plunger pump apparatus further comprising a bearing unit fitted on an outer circumference of the eccentric cam portion, wherein the plunger sliding contacts with the bearing unit at one end portion thereof, and is fitted in a pump housing in such a manner as to reciprocate in a direction perpendicular to a rotational axis of the pump drive shaft, the bearing unit comprises:

a plurality of ball bearings arranged along with an arrangement direction defined to be parallel to the rotational direction of the pump drive shaft; and a cylindrical bush fitting to outer rings of the ball bearings to thereby rotate together with the outer rings, the plunger sliding contacts with the bush at one end portion thereof, and has a piston portion is slidably fitted in the pump housing, a diameter of the piston portion is smaller than a ball distance defined between centers of balls of the ball bearings which are arranged at both ends in the arrangement direction.

According to the first aspect of the invention, the inside of the electric motor can be vented to the outside so as to take in outside air via the vent passage, the reservoir chamber and the drain port and hence can breathe, and even when the air inside the reservoir chamber and the electric motor is caused to contract due to water pressure and cooling when the pump apparatus, which is in a warmed up state due to operation, is submerged, the level of water which has penetrated into the reservoir chamber lies below the vent passage, whereby the penetration of water into the electric motor is prevented in an ensured fashion.

According to the second aspect of the invention, even in the event that the plunger pump apparatus is placed in a posture which is slightly displaced, in terms of angle, about the axes of the pump drive shaft and the rotational shaft from the normal posture, it is possible to prevent as much as possible the penetration of water in the reservoir chamber into the electric motor.

According to the third aspect of the invention, the lower portion of the reservoir chamber than the open end of the drain port to the reservoir chamber can be made to function as a drainage pan for storing working fluid which oozes out of the sealing member to thereby prohibit the leakage of the working fluid that has so oozed out to the outside so as to prevent environmental pollution, and additionally, there is no need to require a component for exclusive use as the drainage pan, thereby making it possible to realize a reduction in production costs.

Furthermore, according to the fourth aspect of the invention, the effective capacity of the reservoir chamber can be adjusted by the closed space formed at least either between the body and the motor adapter or between the motor casing and the motor adapter and a volume occupied by the motor adapter itself, and hence, specifications for an effective capacity of the reservoir chamber can be set relatively inexpensively only by changing the shape of the motor adapter while the shapes of the motor casing and the body remain the same.

According to the fifth aspect of the present invention, since the bearing unit fitted on the eccentric cam portion on the pump drive shaft includes the plurality of ball bearings which are arranged in parallel and the bearing abutment portion provided on the plunger are brought into sliding contact with the outer rings of the respective ball bearings, it is possible not only to suppress vibration and noise to low levels but also to realize a reduction in production cost. Moreover, while the piston portion of the plunger is formed diametrically smaller than the distance between the centers of the balls of the ball bearings which lie at both the ends of the ball bearing arrangement direction, since the bearing abutment portion which is coaxially and continuously connected to the piston portion is brought into sliding contact with the outer rings of the respective ball bearings with both the ends thereof which lie along the axis of the pump drive shaft disposed further outwards than the centers of the balls of the ball bearings which lie at both the ends of the ball bearing arrangement direction, the inclination of the outer rings of the ball bearings relative to the axis of the pump drive shaft is prevented, thereby making it possible to realize a stable operation.

In addition, according to the sixth aspect of the present invention, it is possible to reduce the number of components which make up the plunger, thereby making it possible to avoid an increase in the number of assembling manhours.

Furthermore, according to the seventh aspect of the present invention, since the bearing unit fitted on the eccentric cam portion on the pump drive shaft includes the plurality of ball bearings which are arranged in parallel and the cylindrical bush adapted to rotate together with the outer rings of the ball bearings while allowing the outer rings to be fitted therein, it is possible not only to suppress vibration and noise to low levels but also to realize a reduction in production cost. Moreover, since the plunger having the piston portion which is formed diametrically smaller than the distance between centers of the balls of the ball bearings of the respective ball bearings which lie at both the ends of the direction in which the respective ball bearings are arranged so as to be slidably fitted in the pump housing is brought into sliding contact with the bush at the one end portion thereof, the inclination of the outer rings of the ball bearings relative to the axis of the pump drive shaft is prevented while enabling the piston portion to be formed diametrically small, thereby making it possible to realize a stable operation.

DETAILED DESCRIPTION OF THE PREFERRED EMBODIMENTS

Hereinafter, a mode for carrying out the invention will be described based on embodiments illustrated in the accompanying drawings.

Figure 1:
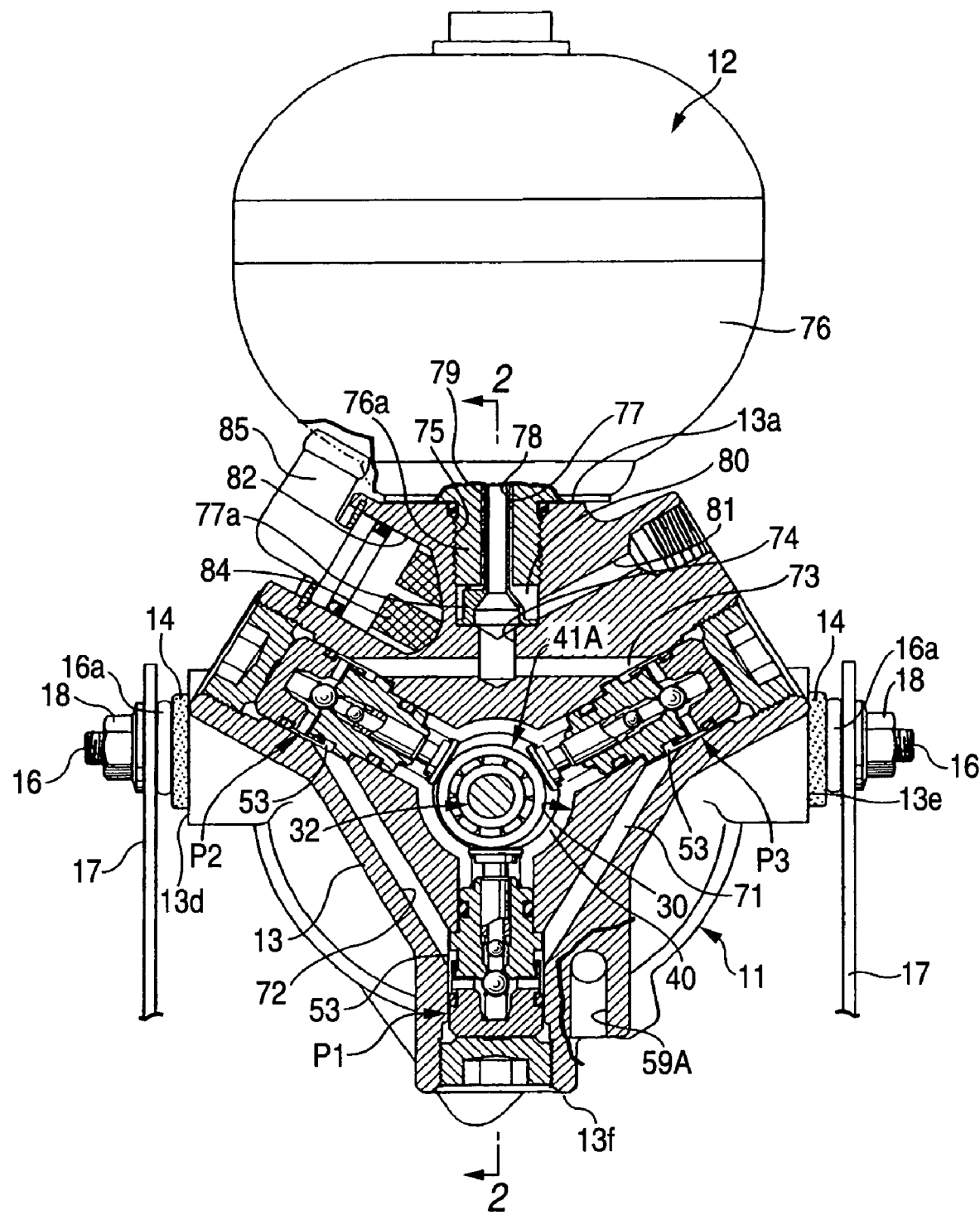
FIG. 1 is a vertical sectional view of a plunger pump apparatus according to a first embodiment, which is taken along the line 1-1 in FIG. 2.
Figure 2:
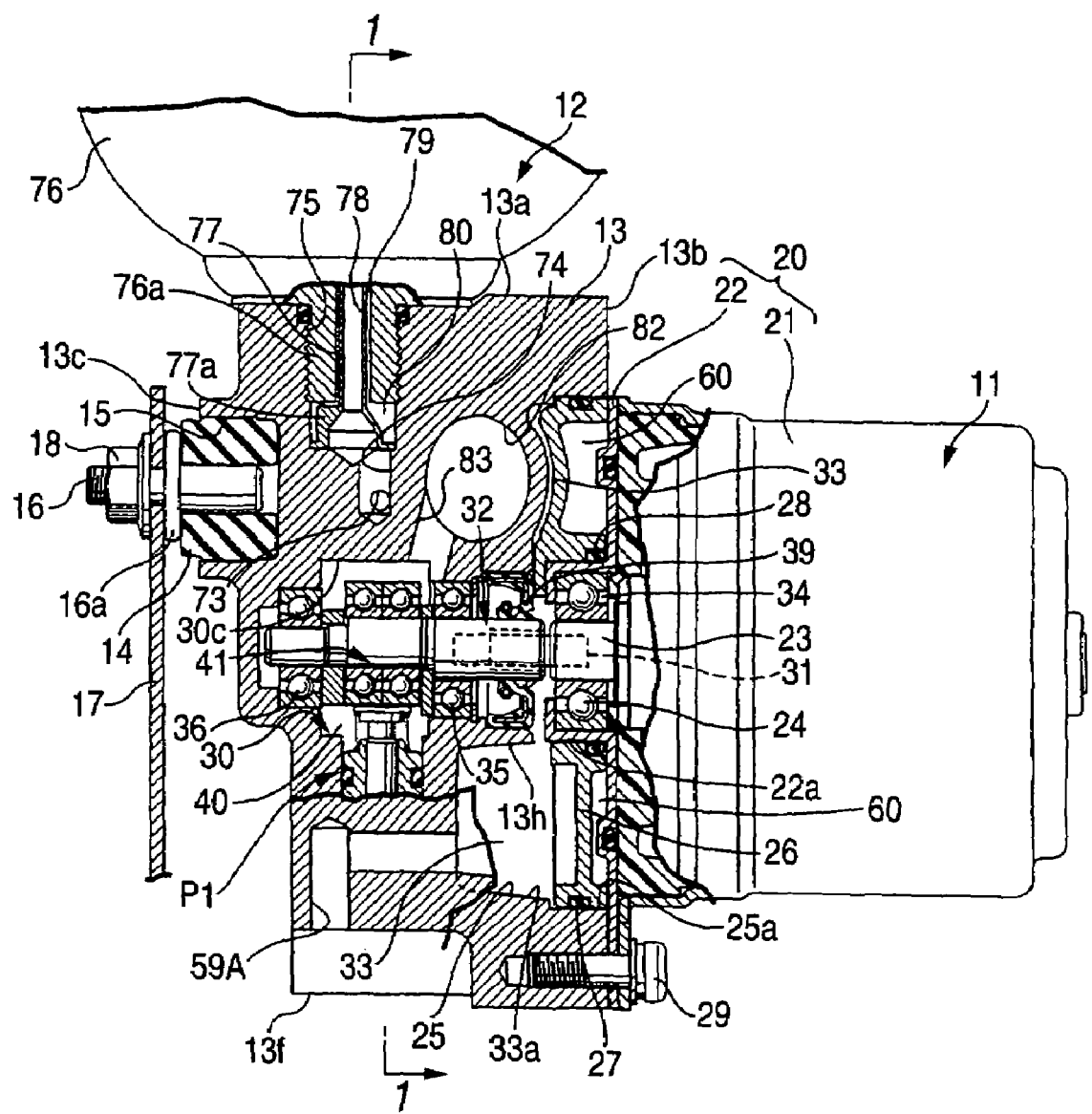
FIG. 2 is a sectional view taken along the line 2-2 in FIG. 1.
Figure 3:
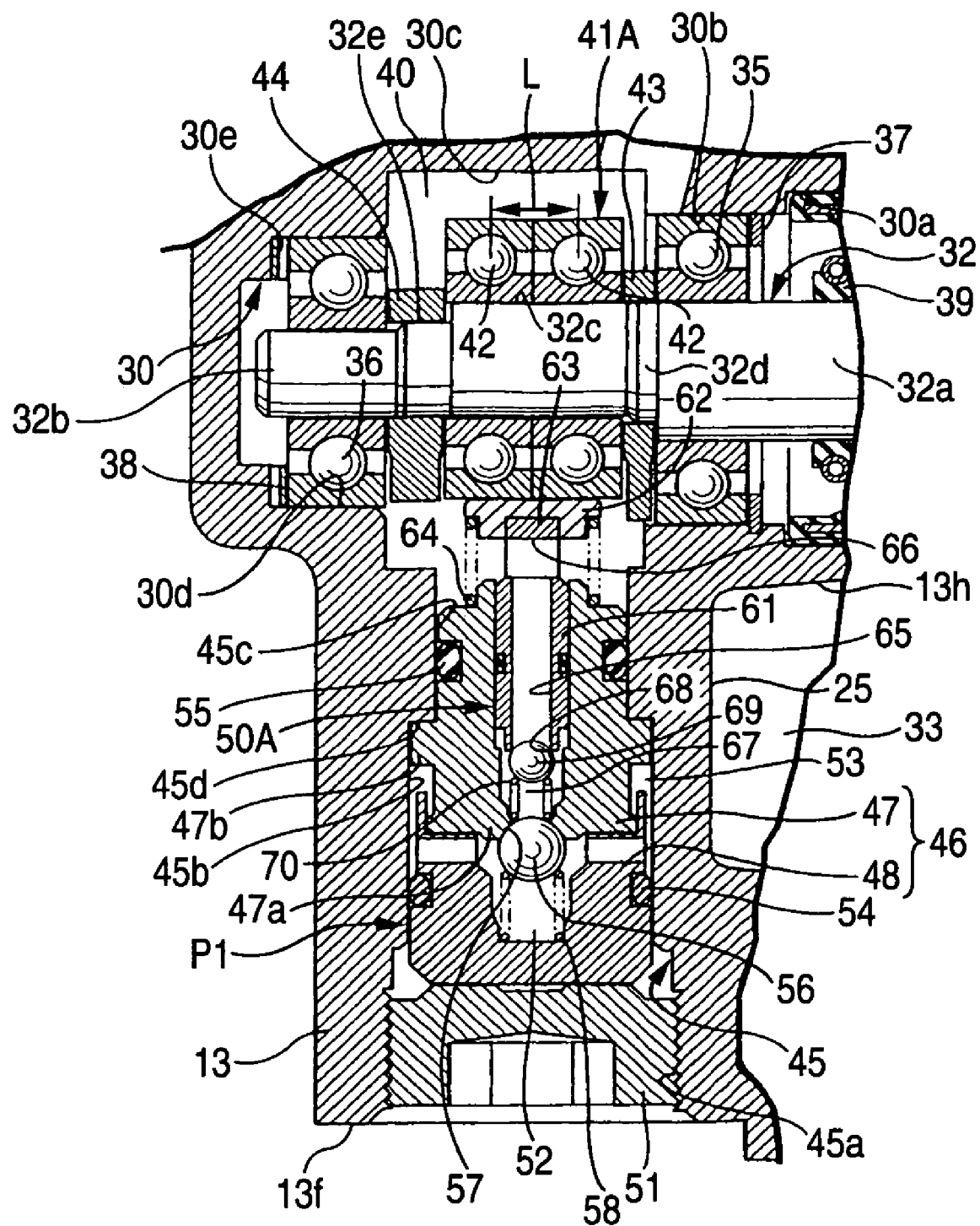
FIG. 3 is an enlarged sectional view of a first pump provided in the plunger pump apparatus.

FIGS. 1 to 3 show a first embodiment of the invention, in which FIG. 1 is a vertical sectional view of a plunger pump apparatus, which is taken along the line 1-1 in FIG. 2, FIG. 2 is a sectional view taken along the line 2-2 in FIG. 1, and FIG. 3 is an enlarged sectional view of a first pump provided in the plunger pump apparatus.

Firstly, in FIGS. 1 and 2, a plunger pump apparatus 1 is made up of first to third pumps P1 to P3, a common electric motor 11 which drives the pumps P1 to P3, and an accumulator 12 which is connected in common to discharge sides of the respective pumps P1 to P3, the pumps, the electric motor and the accumulator being provided in a body 13 formed, for example, of an aluminum alloy or the like. The plunger pump apparatus 1 is then such as to be used, for example, as a hydraulic pressure supply of an automotive brake system, and as a more preferred example, the plunger pump apparatus 1 is installed in a vehicle in a posture in which a rotational axis of the electric motor 11 becomes horizontal (of course, strict horizontality is not always sought for).

The body 13 is such as to have a flat upper surface 13a, a flat first side surface 13b which intersects the upper surface 13a at right angles, a second side surface 13c which is opposite to the first side surface 13b and third and fourth side surfaces 13d, 13e which connect together the first and second side surfaces 13b, 13c. The accumulator 12 is mounted on the upper surface 13a, and the electric motor 11 is mounted on the first side surface 13b. In addition, bottomed mount holes 15 . . . in which cylindrical mount rubbers 14 . . . are fitted are provided, respectively, in the second to fourth side surfaces 13c to 13e, and mount shafts 16 . . . , which have at intermediate portions thereof collar portions 16a . . . which are brought into abutment and engagement with outer edges of the respective mount rubbers 14 . . . , are fitted in the respective mount rubbers 14 . . . at one ends thereof. In addition, nuts 18 . . . are fittingly screwed on to the other ends of the mount shafts 16 . . . which area passed, respectively, through fixed support plates 17 . . . which are mounted on a body, not shown, in such a manner as to hold the support plates 17 . . . between the collars 16a . . . and the nuts themselves.

The motor casing 20 of the electric motor 11 is such as to be made up of a bottomed cylindrical casing main body 21 and a lid element 22 which is disposed so as to close an open end of the casing main body 21, and a cylindrical bearing housing 22a which protrudes to a side of the body 13 is integrally provided at a central portion of the lid element 22, an end portion of a rotational shaft 23 of the electric motor 11 which lies on a side thereof facing the body 13 being supported by the bearing housing 22a via a first ball bearing 24 in such a manner as to rotate freely. Moreover, the electric motor 11 is such as to have a vent passage 34 which establishes a communication between an inside of the electric motor 11 and the outside, and part of the vent passage 34 is formed within the first ball bearing 24 by utilizing a gap within the first ball bearing 24 as the vent passage 34.

A recessed portion 25 is provided on the first side surface 13b of the body 13, and a motor adapter 26 is fitted in a circular fitting hole portion 25a formed at an open end of the recessed portion 25 via an annular sealing member 27, the bearing housing 22a penetrating through the motor adapter 26 via an annular sealing member 28. In addition, the casing main body 21 and the lit element 22, which cooperate with each other to make up the motor casing 20, are such as to be fastened to the first side surface 13b of the body 13 with a plurality of screw members 29 . . . in such a manner as to hold the motor adapter 26 between the lid element 22 and the body 13, and the remaining portion of the open end of the recessed portion 25, which excludes the fitting hole portion 25a, is closed by the motor housing 20 of the electric motor 11 and the motor adapter 26 so as to form a reservoir chamber 33, whereby the vent passage 34 of the electric motor 11 is made to communicate with the reservoir chamber 33 at a vertically intermediate portion thereof.

Moreover, the shape of the motor adapter 26 is determined in such a manner as to form a closed space 60 at least either between the body 13 and the motor adapter 26 or between the motor casing 20 and the motor adapter 26, and in this embodiment, between the motor casing 20 and the motor adapter 26.

A bottomed insertion hole 30, which is coaxial with the rotational shaft 23 of the electric motor 11 and is closed on an opposite side to the electric motor 11, is opened in the body 13 in such a manner that an open end thereof is made to face the bearing housing 22a, and a pump drive shaft 32, whose end portion lying to a side of the electric motor 11 is surrounded by the reservoir chamber 33, is inserted into the insertion hole 30, whereby the end portion of the pump drive shaft 32 which lies to the side of the electric motor 11 is connected to the rotational shaft 23 of the electric motor 11 via a connecting shaft 31 in such a manner as not to rotate relatively thereto and coaxially.

In addition, the reservoir chamber 33 is also formed between the motor adapter 26 and the body 13 even at a upper position than the pump drive shaft 32 and the rotational shaft 23, and by forming the reservoir chamber 33 in such a way, even in case the plunger pump apparatus turn sideways, a space can be secured within the reservoir chamber 33 into which drain collected in the reservoir chamber 33 is allowed to flow, thereby making it possible to ensure the prevention of leakage of drain to the outside even when the pump apparatus is inclined.

Referring to FIG. 3 as well, the pump drive shaft 32 has integrally first and second support shaft portions 32a, 32b which have a circular outer of the rotational shaft 23 and which are disposed, respectively, at axial ends of the pump drive shaft 32, an eccentric cam portion 32c which has a circular outer circumferential surface centered at an axis which deviates from the axis of the rotational shaft 23 and which is disposed between the first and second support shaft portions 32a, 32b, a first connecting shaft portion 32d which connects between the first support shaft portion 32a and the eccentric cam portion 32c and a second connecting shaft portion 32e which connects between the second support shaft portion 32b and the eccentric cam portion 32c, and the first support shaft portion 32a is coaxially connected to the rotational shaft 23 of the electric motor 11 via the connecting shaft 31.

On the other hand, the insertion hole 30, which is provided in the body 13, is such as to have a seal hole portion 30a which is opened to the side of the bearing housing 22a of the electric motor 11 at one end thereof, a first support hole portion 30b which is formed diametrically smaller than the seal hole portion 30a and which continues coaxially to the other end of the seal hole portion 30a at one end thereof, a large diameter hole portion 30c which is formed diametrically lager than the first support hole 30b and which continues coaxially to the other end of the first support hole portion 30b at one end thereof, a second support hole portion 30d which is formed diametrically smaller than the large diameter hole portion 30c and which continues coaxially to the other end of the large diameter hole portion 30c at one end thereof and an annular stepped portion 30e which continues to the other end of the second support hole portion 30d at right angles while facing a side of the electric motor 11, and the seal hole portion 30a and the first support hole portion 30b are disposed at positions which substantially correspond to the first support shaft portion 32a of the pump drive shaft 32, the large diameter hole portion 30c is disposed at a position which substantially corresponds to the eccentric cam portion 32c of the pump drive shaft 32, and the second support hole portion 30d and the annular stepped portion 30e are disposed at positions which substantially correspond to the second support shaft portion 32b of the pump drive shaft 23.

A second ball bearing 35 is interposed between an inner surface of the first support hole portion 30b of the insertion hole 30 and an outer surface of the first support shaft portion 32a of the pump drive shaft 32, and a third ball bearing 36 is interposed between an inner surface of the second support hole portion 30d of the insertion hole 30 and an outer surface of the second support shaft portion 32b of the pump drive shaft 32. Inner rings of the second ball bearing 35 and the third ball bearing 36 are press fitted on the first support shaft portion 32a and the second support shaft portion 32b of the pump drive shaft 32, respectively, and outer rings of the second ball bearing 35 and the third ball bearing 36 are loose fitted in the first support hole portion 30b and the second support hole portion 30d of the insertion hole 30, respectively In addition, a snap ring 37, which is brought into abutment with an outer end of the outer ring of the second ball bearing 35, is mounted on the inner surface of the first support hole portion 30b, and a wave washer 38 is interposed between the outer ring of the third bearing 36 and the annular stepped portion 30e.

In addition, an oil seal 39, which is an annular seal member, is mounted on an end portion of the pump drive shaft 32 which lies to the side of electric motor 11, that is, in such a manner as to closely contact an outer circumference of the first support shaft portion 32a around the full circumference thereof, while facing the reservoir chamber 33, so that a seal is formed between the open end portion of the insertion hole 30 and the pump drive shaft 32 by this oil seal 39, whereby a suction chamber 40 is formed between a majority portion of the pump drive shaft 32 including the eccentric cam portion 32c and the body 13 for common use for the first to third pumps P1 to P3.

Moreover, of the insertion hole 30, the seal hole portion 30a and part of the first support hole portion 30b are formed within a cylindrical support portion 13h which is integrally provided on the body 13 in such a manner as to protrude from a closed end of the recessed portion 25 so as to thrust into the reservoir chamber 33, and the oil seal 39 is interposed between the pump drive shaft 32 and the support portion 13h which surrounds the pump drive shaft 32, while facing the reservoir chamber 33.

Incidentally, a bearing unit 41A made up of a plurality of, for example, a pair of ball bearings 42, 42 is fitted on the eccentric cam portion 32c of the pump drive shaft 32, and a first spacer 43, which is interposed between the ball bearing 42 of the bearing unit 41A and the inner ring of the second ball bearing 35, is fitted on the first shaft connecting portion 32d between the eccentric cam portion 32c and the first support shaft portion 32a, and a second spacer 44, which is interposed between the other ball bearing 42 of the bearing unit 41A and the inner ring of the third ball bearing 36, is fitted on the second shaft connecting portion 32e between the eccentric cam portion 32c and the second support shaft portion 32b.

The first pump P1 is made to extend downwards to intersect an axis of the insertion hole 30 or the pump drive shaft 32 at right angles at a position in the insertion hole 30 which corresponds to the large diameter hole portion 30c and is made up of a pump housing 46 which is fitted into a mounting hole 45 which is provided in the body 13 in such a manner as to be opened towards the large diameter hole portion 30c at an inner end and to be opened through a lower surface 13f of the body 13 towards the outside at an outer end thereof from an axially outward direction so as to be fixed therein and a plunger 50A which is slidably fitted in the pump housing 46 and is brought into sliding contact with the bearing unit 41A at one end thereof, and the outer end of the mounting hole 45 is closed with a plug 51.

The mounting hole 45 is such as to extend in a direction which intersects the axis of the pump drive shaft 32 at right angles, and the mounting hole 45 is made up, sequentially in the order of description from the outer end towards the inner end thereof, of a threaded hole portion 45a which is opened through the lower surface 13f of the body 13 at an outer end thereof, a first hole portion 45b which is formed diametrically smaller than the threaded portion 45a and which continues coaxially to an inner end of the threaded hole portion 45a at an outer end thereof and a second hole portion 45c which is formed diametrically smaller than the first hole portion 45b and which continues coaxially to an inner end of the first hole portion 45b at an outer end thereof, and an annular stepped portion 45d is formed between the first and second hole portions 45b, 45c in such a manner as to face axially outwardly of the mounting hole 45.

The pump housing 46 is made up of a cylindrical cylinder unit 47 having at a central portion of an outer end thereof an inwardly oriented collar 47a which expands radially inwardly and having around an outer circumference of an intermediate portion thereof an engagement collar portion 47b which is brought into abutment with the stepped portion 45d of the mounting hole 45 from an axially outward direction and a bottomed cylindrical unit 48 which is crimp connected to an outer end portion of the cylinder unit 47. Thus, the plug 51, which is brought into abutment with an outer end of the bottomed cylindrical unit 48, is tightly screwed into the threaded hole portion 45a of the mounting hole 45 in such a state that the cylinder unit 47 is fitted in the second hole portion 45c of the mounting hole 45 and the bottomed cylindrical unit 48 is fitted in the first hole portion 45b, whereby the pump housing 46 is fixed to the body 13 within the mounting hole 45 in such a state as to be held between the stepped portion 45d and the plug 51.

A discharge chamber 52 is formed between the cylinder unit 47 and the bottomed cylindrical unit 48, and an annular discharge chamber 53, which communicates with the discharge chamber 52, is formed within the first hole portion 45b in such a manner as to surround a connecting portion between the cylinder unit 47 and the bottomed cylindrical unit 48. Moreover, annular seal members 54, 55 are mounted on outer circumferences of the bottomed cylindrical unit 48 and the cylinder unit 47, respectively, which are brought into spring-like contact with inner surfaces of the first and second hole portions 45b, 45c in such a manner as to seal the annular discharge chamber 53 from both axial directions.

A valve seat 57, on which a spherical discharge valve 56 accommodated within the discharge chamber 52 can be seated, is formed on an inner circumferential portion, which faces the discharge chamber 52, of the inwardly oriented collar 47a of the cylinder unit 47 which is provided at the central portion of the outer end thereof, and the discharge valve 56 is biased in a direction in which the discharge valve 56 is seated on the valve seat 57 by means of a valve spring 58 which is provided between the bottomed cylindrical unit 48 and the valve itself in a compressed state.

The plunger 50A is such as to be made up of a piston portion 61 which is slidably fitted in the cylinder unit 47 of the pump housing 46 and a bearing abutment portion 62 which is continuously connected to the piston portion 61 in such a manner as to slidably contact outer rings of the pair of ball bearings 42, 42 which make up the bearing unit 41A, and the piston portion 61 is continuously connected to the bearing abutment portion 62 via a connecting rod portion 63.

The piston portion 61 is such that a suction path 65 is formed therein axially over the full length thereof, is formed into a cylindrical shape whose outside diameter is smaller than a distance L between centers of balls of the pair of ball bearings which are disposed in parallel with each other in such a manner as to make up the bearing unit 41A and is hermetically and slidably fitted in the cylinder unit 47 in such a manner as to form a pump chamber 67 between the inwardly oriented collar 47a of the cylinder unit 47 and the piston portion 61 itself.

An annular valve seat 68 is formed at the center of an end portion of the piston portion 61 which lies to a side of the pump chamber 67 in such a manner as to surround an open end of the suction path 65 which lies to the side of the pump chamber 67, and a spherical suction valve 69 which can be seated on the valve seat 68 is accommodated in the pump chamber 67, a valve spring 70 which biases the suction valve 69 in a direction in which the suction valve 69 is seated on the valve seat 68 being provided between the inwardly oriented collar 47a of the cylinder unit 47 and the suction valve 69 in a compresses state.

The connecting rod portion 63 is such as to be integrally provided so as to continuously connect to the piston portion while forming a communication path 66 which establishes a communication between the suction path 65 of the piston portion 61 and the suction chamber 40, and the bearing abutment portion 62 of a shoe shape, which is separate from the piston portion 61 and the connecting rod portion 63, is fitted on a distal end portion of the connecting rod portion 63, and a spring 64, which biases one end portion of the plunger 50A, that is, the bearing abutment portion 62 towards a side of the bearing unit 41A, is provided between the piston portion 61 and the bearing abutment portion 62 in a compressed state.

Moreover, the bearing abutment portion 62 is formed so as to be brought into sliding contact with the outer rings of the pair of ball bearings 42, 42 which make up the bearing unit 41A with both ends of the bearing abutment portion 62 extending along the axis of the pump drive shaft 32 disposed further outwards than the centers of the balls of the respective ball bearings 42, 42.

In other words, the plunger 50A is constituted as follows. The plurality of ball bearings 42 are arranged along with an arrangement direction defined to be parallel to the rotational direction of the pump drive shaft (32). The plunger 50A has the piston portion 61 slidably fitted in the pump housing 46. Wherein the diameter of the piston is smaller than a ball distance defined between centers of balls of the ball bearings 42 which are arranged at both ends in the arrangement direction. The bearing abutment portion 62 of the plunger 50A is coaxially and continuously connected to the piston portion 61 so as to sliding contact with outer rings of the respective ball bearings (42). Wherein an abutment length defined between both ends of the bearing abutment portion 62 in the arrangement direction is set larger than the ball distance.

In the first pump P1 which is configured as has been described heretofore, an eccentric motion is imparted to the bearing unit 41A via the eccentric cam portion 32c in response to the rotation of the pump drive shaft 32 occurring when the electric motor 11 is put into operation, whereby the plunger 50A is reciprocated within the pump housing 46, and the formation of communication and the disruption of communication between the suction chamber 40 and the pump chamber 67 is changed over by the suction valve 69 in response to reduction and increase in pressure in the pump chamber 67, and the formation of communication and the disruption of communication between the pump chamber 67 and the discharge chamber 52 is changed over by the discharge valve 56 in response to reduction and increase in pressure in the pump chamber 67.

The second and third pumps P2, P3 are such as to basically have the same configuration as that of the first pump P1, and the first to third pumps P1 to P3 are disposed around the periphery of the insertion hole 30 in a radial fashion at the same intervals provided therebetween in a circumferential direction about the axis of the pump drive shaft 32.

A drain port 59A, which allows the reservoir chamber 33 to communicate with the outside, is provided in a lower portion of the body 13 at a position which circumferentially deviates from the first pump P1 in such a manner as to communicate with the reservoir chamber 33 at a position above a bottom surface 33a of the reservoir chamber 33 and below the oil seal 39 with its external open end oriented downwardly. By disposing the drain port 59A which is configured as described above, the reservoir chamber 33 enables the storage of working fluid which has oozed out of the oil seal 39 between an open end of the drain port 59A to the reservoir chamber 33 and the bottom surface 33a of the reservoir chamber 33. In addition, the vent passage 34 provided in the electric motor 11 is such as to communicate with the reservoir chamber 33 at a position which substantially oppositely faces the oil seal 39, and the open end of the drain port 59A to the reservoir chamber 33 is to be disposed further downwards than an opening of the vent passage 34 to the reservoir chamber 33.

Moreover, a capacity of the reservoir chamber 33 below the vent passage 34 is set to become large than a sum of a cooling contraction amount of air in the electric motor 11 and the reservoir chamber 33 which contracts in response to cooling by water covering the pump apparatus which has been warmed up under an operating environment and a pressurizing compression amount of air in the electric motor 11 and the reservoir 33 chamber which is compressed by a water pressure applied from the drain port 59A when the pump apparatus is submerged.

In so setting, for example, an estimated temperature of the plunger pump apparatus, an estimated water temperature and an estimated water pressure exerted when the pump apparatus is submerged at an estimated depth are appropriately set in accordance with an estimated operating environment, and following this, a volume contraction amount ΔV at the time of submergence is obtained from the equation of state of gas (PV=nRt), whereby assuming that the volume of the reservoir chamber 33 below the vent passage 34 is Vr and a maximum volume of drain to be stored is Vd, the aforesaid setting is implemented so that {Vr>ΔV+Vd} is established.

Moreover, in adjusting the volume of the reservoir chamber 33, it is desirable to deal with such adjusting by changing the shape of the motor adapter 26, and in case this becomes possible, since the shapes of the body 13 and the motor casing 20 do not have to be changed, specifications adapted to various operating environments can be set at low costs.

Discharge communication paths 71, 72, 73 are provided in the body 13, which make connections between the annular discharge chambers 53 . . . of the first to third pumps P1 to P3, and a passage 74, which communicates with a middle portion of the discharge communication path 73 which connects together the annular discharge chambers 53 . . . of the second and third pumps P2, P3, is opened in a closed end of a bottomed accumulator mounting hole 75 provided in the body 13 in such a manner as to be opened in the upper surface 13a.

A casing 76 of the accumulator 12 has integrally a connecting tube portion 76a which is hermetically screwed into the accumulator mounting hole 75, and an entrance tube 77 which forms an entrance passage 78 is inserted into the connecting tube portion 76a in such a manner as to form an annular exit passage 79 between an inner surface of the connecting tube portion 76a and itself. Moreover, the entrance tube 77 has integrally a diametrically extended portion 77a which is held between closed ends of the connecting tube portion 76a and the accumulator mounting hole 75, and this diametrically extended portion 77a allows the passage 74 to communicate with the entrance passage 78 and at the same time, forms an exit chamber 80 which communicates with the exit passage 79 between the body 13 and itself. In addition, an exit side connecting passage 81 which communicates with the exit chamber 80 is provided in the body 13, and a path, not shown, which introduces a hydraulic pressure from the accumulator 12 is connected to the exit side connecting passage 81.

Thus, while working fluid discharged from the respective pumps P1 to P3 is to be discharged from the exit side connecting passage 81 by way of the accumulator 12, since the annular discharge chambers 53 . . . of the respective pumps P1 to P3 are allowed to communicate with each other, there can be provided an advantage that a reduction in efficiency at the respective pumps P1 to P3 can be prevented by virtue of mutual actions of discharge pulses between the respective pumps P1 to P3.

In addition, an entrance side passage 82, which communicates with the suction chamber 40 via a communication path 83, is provided in the body 13, and an entrance side connecting tube 85 having a filter 84 inserted into the entrance side passage 62 is connected to an outer end portion of the entrance side passage 82, the entrance side connecting tube 85 being connected to a reservoir, not shown.

Next, the function of the first embodiment will be described. The pump drive shaft 32, which is used commonly for the respective pumps P1 to P3, is inserted into the insertion hole 30 in the body 13, and since the bearing unit 41A, which is fitted on the outer circumference of the eccentric cam portion 32c provided on the pump drive shaft 32, is made up of the plurality of ball bearings 42, 42 which are disposed in parallel with the axial direction of the pump drive shaft 32 and the end portions of the plungers 50A . . . in the respective pumps P1 to P3 are brought into sliding contact with outer surfaces of the outer rings of the ball bearings 42, 42, it is possible to realize the suppression of vibrations and noise to lower levels and the reduction in production costs.

Moreover, the plunger 50A is such as to have the piston portion 61 which is formed diametrically smaller than the distance L between the centers of the balls of the pair of ball bearings 42, 42 which make up the bearing unit 41A so as to be fitted in the pump housing 46 in such a manner as to freely slide therein and the bearing abutment portion 62 which is coaxially and continuously connected to the piston portion 61 in such a manner as to be brought into sliding contact with the outer rings of the respective ball bearings 42, 42, whereby a sliding fitting portion of the plunger 50A into the pump housing 46 is made as diametrically small as possible by forming the piston portion 61 diametrically small from the viewpoints of efficiency and strength, so that the stroke can be made relatively long.

Furthermore, since the bearing abutment portion 62, which is coaxially and continuously connected to the piston portion 61, is formed so as to be brought into sliding contact with the outer rings of the pair of ball bearings 42, 42 with both the ends of the bearing abutment portion 62 extending along the axis of the pump drive shaft 32 disposed further outwards than the centers of the balls of the respective ball bearings 42, 42, the inclination of the outer rings of the ball bearings 42, 42 relative to the axis is prevented, thereby making it possible to realize a stable operation.

In addition, since the reservoir chamber 33, which is made to communicate with the inside of the electric motor 11 so as to the vent passage 34 provided in the electric motor 11 communicable, is formed between the motor casing 20 of the electric motor 11 and the body 13 in which the drain port 59A, which communicates with the reservoir chamber 33 at the position below the open end of the vent passage 34 to the reservoir chamber 33 so as to make the reservoir chamber 33 communicate with the outside, is provided with the external open end thereof oriented downwardly, and since the capacity of the reservoir chamber 33 below the vent passage 34 is set to become larger than the sum of a cooling contraction amount of air in the electric motor 11 and the reservoir chamber 33 which contracts in response to cooling by water covering the pump apparatus which has been warmed up under an operating environment and a pressurizing compression amount of air in the electric motor 11 and the reservoir 33 chamber which is compressed by a water pressure applied from the drain port 59A when the pump apparatus is submerged, outside air flows into the electric motor 11 via the vent passage 34, the reservoir chamber 33 and the drain port 59A and hence the electric motor 11 can breathe. Moreover, even in the event that air inside the reservoir chamber 33 and the electric motor 11 contracts due to water pressure and cooling which both result when the pump apparatus is submerged, the level of water which has penetrated into the reservoir chamber 33 is situated further downwards than the vent passage 34, whereby the penetration of water into the electric motor is prevented in an ensured fashion.

In addition, since the pump drive shaft 32 having the horizontal axis is connected to the rotational shaft 23 of the electric motor 11 coaxially and in such a manner as not to rotate relatively thereto at the vertically intermediate portion of the reservoir chamber 33, part of the vent passage 34 is formed in the first ball bearing 24 which supports the rotational shaft 23 on the motor casing 20 freely rotatably, and the oil seal 39, which is interposed between the pump drive shaft 32 and the body 13 in such a manner as to prevent the leakage of fluid from the pumps P1 to P3, is disposed in such a manner as to face the reservoir chamber 33 which surrounds the end portion of the pump drive shaft 32 which lies to the side of the electric motor 11, even in the event that the plunger pump apparatus is disposed in a posture which is slightly displaced in terms of angle about the axes of the pump drive shaft 32 and the rotational shaft 23 from the normal posture, not only can the penetration of water in the reservoir chamber 33 into the electric motor 11 be prevented as much as possible but also the reverse flow of water towards the pumps P1 to P3 via the oil seal 39 can be prevented as much as possible.

In addition, since the oil seal 39, which forms a seal between the suction chamber 40 which is formed between the body 13 and the pump drive shaft 32 so as to store working fluid raised by the respective pumps P1 to P3 and the reservoir chamber 33, is interposed between the pump drive shaft 32 and the support portion of the body 13 while facing the reservoir chamber 33, and the drain port 59A is provided in the body 13 in such a manner as to communicate with the reservoir chamber 33 at the position further upwards than the bottom surface 33a of the reservoir chamber 33, the lower portion of the reservoir chamber 33 which lies further downwards than the open end of the drain port 59A to the reservoir chamber 33 can be made to function as a drainage pan which stores working fluid which has oozed out of the oil seal 39, whereby the leakage to the outside of working fluid that has so oozed out can be prevented so as to prevent environmental pollution, and hence the necessity of exclusive components for a drainage can be obviated, thereby making it possible to reduce the production costs. Moreover, in case the amount of working fluid which so oozes out is increased for some reason, working fluid that has so oozed out can be discharged to the outside from the drain port 59A without allowing the working fluid to be reversed from the oil seal 39 towards the pumps P1 to P3, whereby the function of the pumps P1 to P3 is damaged in no case.

Moreover, since the cylindrical support portion 13h is provided on the body 13 which surrounds the pump drive shaft 32 and thrusts into the reservoir chamber 33, and the oil seal 39 is interposed between the pump drive shaft 32 and the support portion 13h, even in the event that the plunger pump apparatus is put in a posture in which the axis of the pump drive shaft 32 is inclined slightly, working fluid that has leaked from the side of the pumps P1 to P3 can be prevented from flowing out towards the reservoir chamber 33 by means of the oil seal 39 as much as possible, and even in the event that working fluid is stored within the reservoir chamber 33, the working fluid within the reservoir chamber 33 is reversed towards the pumps P1 to P3 by way of the oil seal 39 in no case.

In addition, since the recessed portion 25 is provided on the side surface 13b of the body 13 and the electric motor 11 and the motor casing 20 are mounted on the side surface 13b of the body while closing the open end of the recessed portion 25 in such a manner as to form the reservoir chamber 33 between the body and themselves, the formation of the reservoir chamber 33 is facilitated, and moreover, the capacity of the reservoir chamber 33 can be set as large as possible.

Furthermore, since the shape of the motor adapter 26 is determined in such a manner as to form, for example, the single closed space 60 at least either between the body and the motor adapter 26 or between the motor casing 20 and the motor adapter 26, and in this embodiment, between the motor casing 20 and the motor adapter 26, the effective capacity of the reservoir chamber 33 can be adjusted by the capacity occupied by the closed space 60 and the motor adapter 26, whereby specifications for an effective capacity of the reservoir chamber 33 can be set relatively inexpensively only by changing the shape of the motor adapter 26 while the shapes of the motor casing 20 and the body 13 are kept remaining the same.

Figure 4:
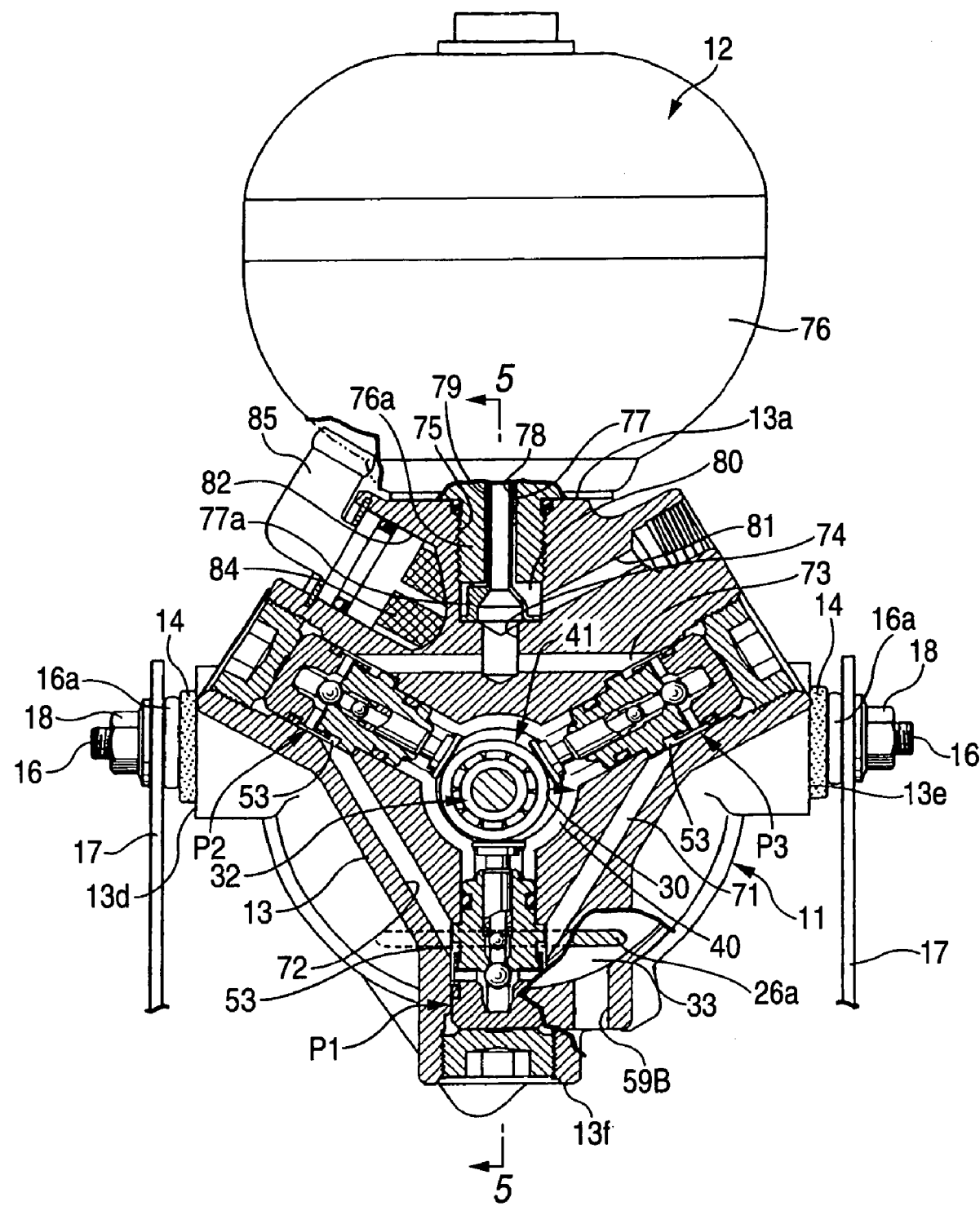
FIG. 4 is a sectional view corresponding to FIG. 1, which shows a plunger pump apparatus according to a second embodiment.
Figure 5:
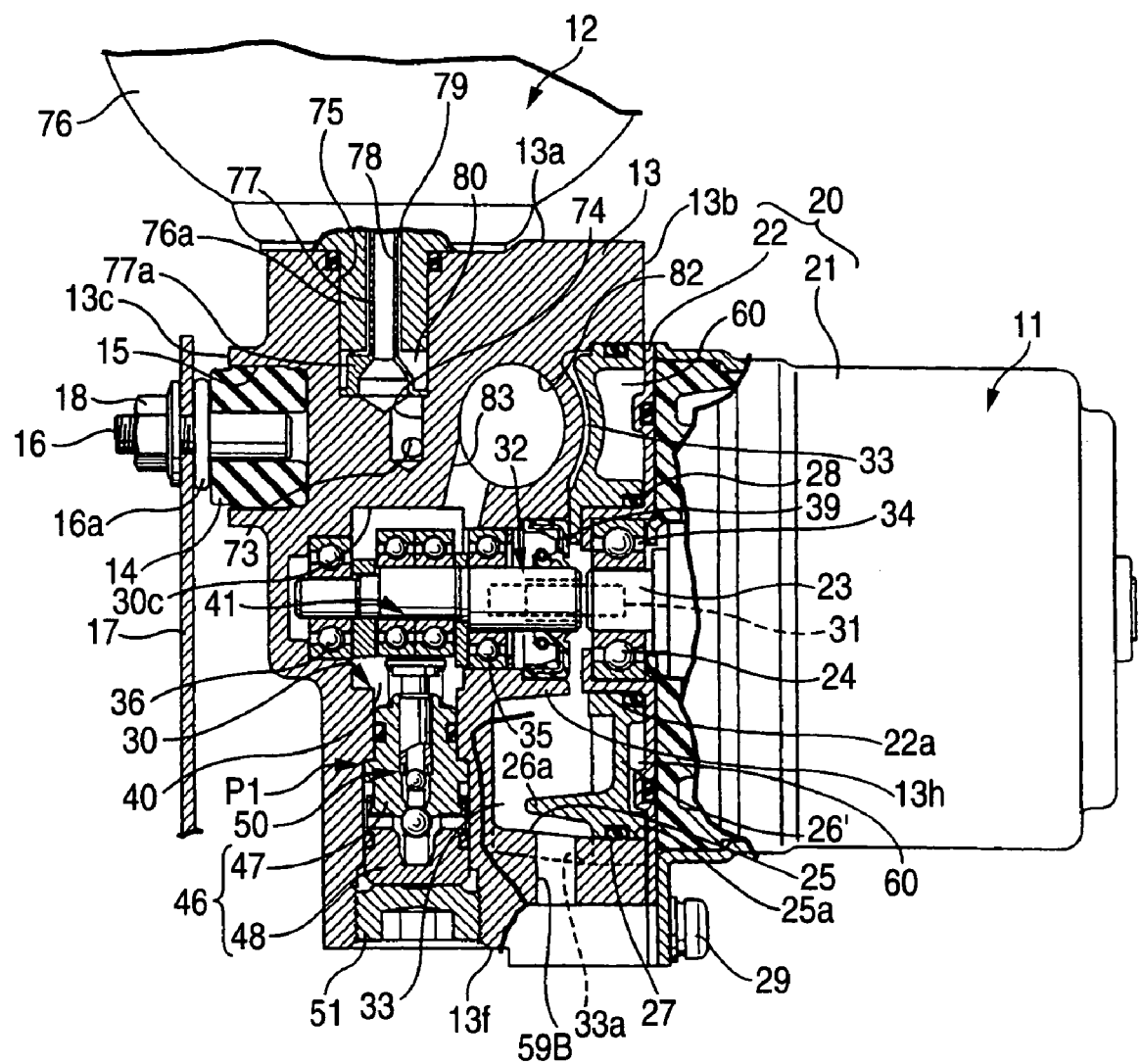
FIG. 5 is a sectional view taken along the line 5-5 in FIG. 4.

FIG. 4 is a sectional view corresponding to FIG. 1, which shows a plunger pump apparatus according to a second embodiment of the invention, and FIG. 5 is a sectional view taken along the line 5-5 in FIG. 4. Like reference numerals are imparted to like portions to those described with respect to the first embodiment, and the description thereof will be omitted.

In this second embodiment, a drain port 59B, whose external open end is oriented downwardly so as to make a reservoir chamber 33 communicate with the outside, is provided in the body 13 at a position which is displaced in a circumferential direction from a first pump P1 in such a manner as to communicate with the reservoir chamber 33 at a position which is further upwards than a bottom surface 33a of the reservoir chamber and is further downwards than an oil seal 39. Moreover, a baffle plate 26a, which covers an open end of the drain port 59A to the reservoir chamber 33 from thereabove, is integrally provided on a motor adapter 26' which is fitted in the body 13 in such a manner as to close an open end of a recessed portion 25 provided on a first side surface 13b of the body 13.

According to the second embodiment of the invention, an advantage similar to that of the first embodiment can be provided, and moreover, the penetration of water from the drain port 59B to the reservoir chamber 33 can be suppressed as much as possible by the baffle plate 26a.

Figure 6:
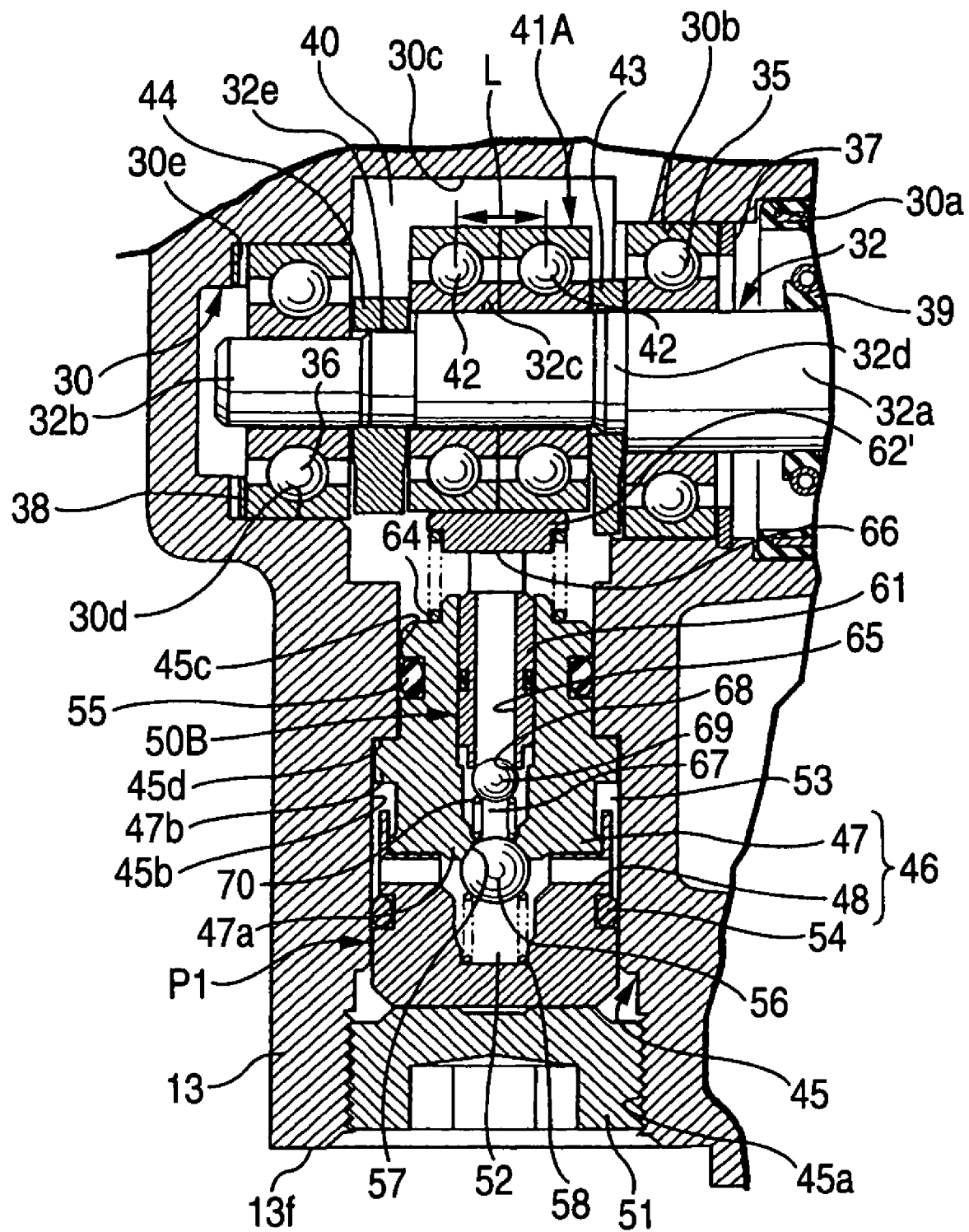
FIG. 6 is a sectional view corresponding to FIG. 3, which shows a third embodiment.

FIG. 6 shows a third embodiment of the invention, and like reference numerals are imparted to like constituent elements to those described with reference to the first embodiment, and the like constituent elements are only shown in the figure, omitting a detailed description thereof.

A plunger 50B is such as to have a piston portion 61 which is fitted in a cylinder unit 47 of a pump housing 46 freely slidably and a bearing abutment portion 62' which is continuously connected to the piston portion 61 in such a manner as to be brought into sliding contact with outer rings of a pair of ball bearings 42, 42 which make up a bearing unit 41A, and the piston portion 61 is provided to integrally continue to the bearing abutment portion 62'.

Moreover, the piston portion 61 is such as to be formed into a cylindrical shape which has a smaller outside diameter than a distance L between centers of balls of the pair of ball bearings 42, 42 which are arranged in parallel in such a manner as to make up the bearing unit 41A and to be slidably fitted in the cylinder unit 47 in a hermetical fashion. The bearing abutment portion 62' is formed in such a manner as to be brought into sliding contact with outer rings of the pair of ball bearings 42, 42 which make up the bearing unit 41A with both ends thereof which lie along an axis of a pump drive shaft 32 disposed further outwards than the centers of the balls of the respective ball bearings 42, 42.

According to the third embodiment, in addition to a similar advantage to that provided by the first embodiment, the number of components making up the plunger 50B can be reduced, thereby making it possible to avoid an increase in the number of assembling manhours.

Figure 7:
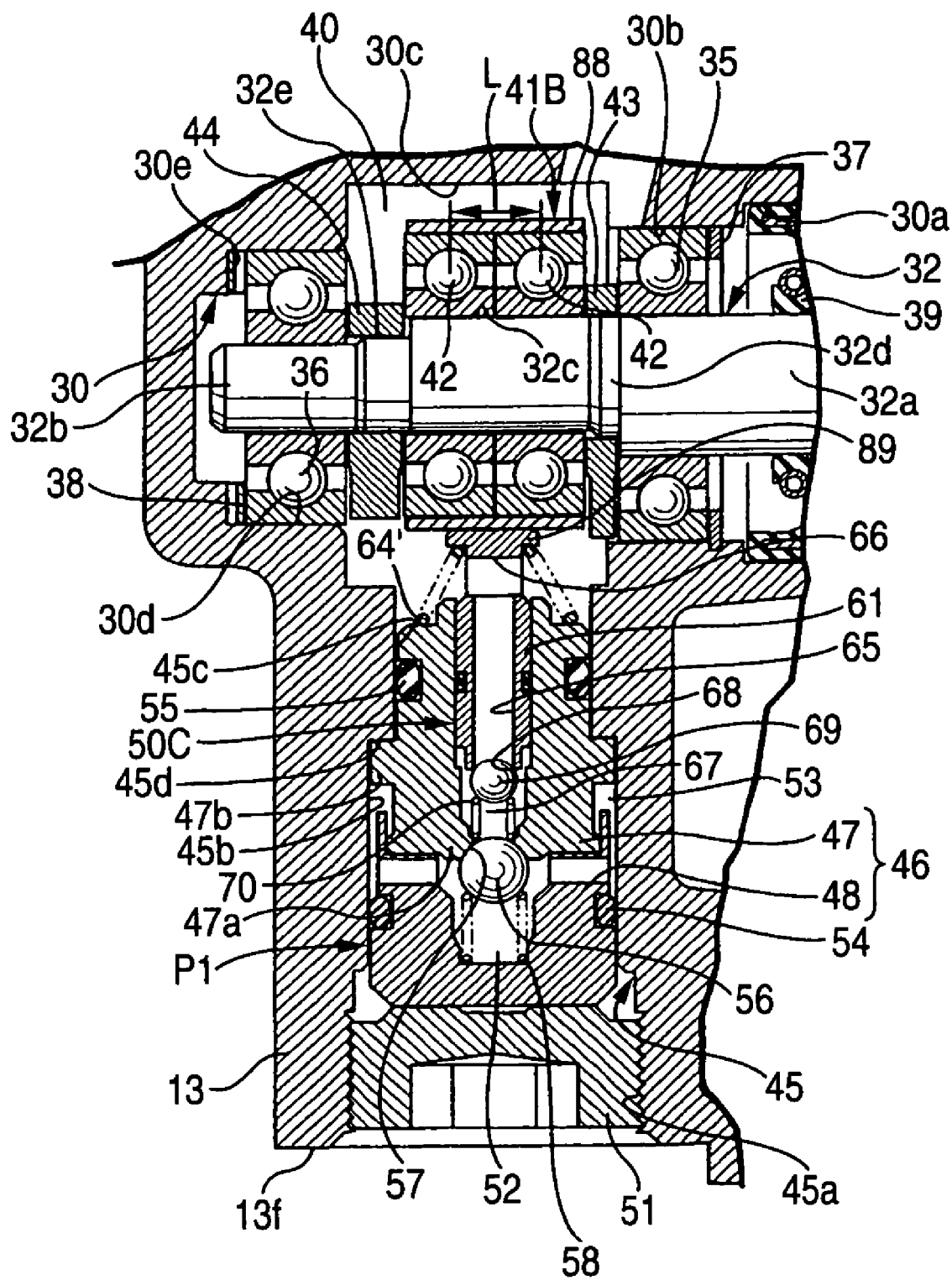
FIG. 7 is a sectional view corresponding to FIG. 3, which shows a fourth embodiment.

FIG. 7 shows a fourth embodiment, and like reference numerals are imparted to like constituent elements to those described with reference to the first and third embodiments, and the like constituent elements are only shown in the figure, omitting a detailed description thereof.

A bearing unit 41B fitted on an outer circumference of an eccentric can portion 32c provided on a pump drive shaft 32 is made up of a plurality of, for example, a pair of ball bearings 42, 42 which are arranged in parallel in an axial direction of the pump drive shaft 32 and a cylindrical bush 88 adapted to rotate together with outer rings of the ball bearings 42, 42 while allowing the outer rings to be fitted therein.

On the other hand, a plunger 50C, which is biased to a side of the bearing unit 41B by a spring 64' which is provided between a pump housing 46 and the plunger 50C in a compressed state is made up of a piston portion 61 which is formed diametrically smaller than a distance L between centers of balls of the ball bearings 42, 42 which make up part of the bearing unit 41B so as to be fitted in the pump housing freely slidably and a pressing rod portion 89 which continues to the piston portion 61 coaxially, and the pressing rod portion 89 which constitutes an end portion of the plunger 50C is brought into sliding contact with the push 88.

According to the fourth embodiment, since the bearing unit 41B is made up of the pair of ball bearings 42, 42 which are arranged in parallel and the cylindrical bush 88 adapted to rotate together with the outer rings of the ball bearings 42, 42 while allowing the outer rings to be fitted therein, it is possible not only to suppress vibration and noise to low levels but also to realize a reduction in production cost.

Moreover, since the end portion of the plunger 50C having the piston portion 61 which is formed diametrically smaller than the distance L between the centers of the balls of both the ball bearings 42, 42 so as to be fitted in the pump housing 46 freely slidably is brought into sliding contact with the bush 88, the inclination of the outer rings of the ball bearings 42, 42 relative to the axis of the pump drive shaft 32 is prevented while enabling the reduction of the diameter of the piston portion 61, thereby making it possible to realize a stable operation.

Thus, while the embodiments of the invention have been described heretofore, the invention is not limited to those embodiments, but various design changes can be made thereto without departing from the scope of the accompanying claims of the invention.

For example, the number of pumps provided in the plunger pump apparatus is not limited to three, and the setting posture of the plunger pump apparatus is not limited to the posture in which the pump drive shaft 32 becomes horizontal.

While in the respective embodiments that have been described heretofore, the pair of ball bearings 42, 42 which are arranged in parallel are described as being fitted on the eccentric cam portion 32c on the pump drive shaft 32, a plurality of or three or more ball bearings may be fitted on the eccentric cam portion 32c in such a state that the ball bearings are arranged in parallel. In this case, the piston portion of the plunger is formed diametrically smaller than a distance between centers of balls of ball bearings of the respective ball bearings which lie at both ends of the ball bearing arrangement direction so as to be fitted in the pump housing freely slidably, and in a case where the bearing abutment portion at the one end portion of the plunger is brought into direct contact with the outer rings of the respective ball bearings, the bearing abutment portion may be formed such that both the ends of the bearing abutment portion which lie along the axis of the drive shaft are disposed further outwards than the centers of the balls of the ball bearings which lie at both the ends of the ball bearing arrangement direction.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A plunger pump apparatus comprising:
   a body;
   an electric motor mounted on one side of the body for rotating a pump drive shaft having an eccentric cam portion;
   at least one of pumps provided in the body and having a plunger reciprocated by the eccentric cam portion;
   a reservoir chamber formed between a motor casing of the electric motor and the body, and communicating with a vent passage provided in the electric motor to thereby communicate with an inside of the electric motor; and
   a drain port provided in the body having an external open end thereof oriented downwardly so as to communicate the reservoir chamber to an outside,
   wherein a capacity of the reservoir chamber below the vent passage is set to become larger than a sum of
      a cooling contraction amount of air in the electric motor and the reservoir chamber which contracts according to cooling by water covering the pump apparatus which has been warmed up under an operating environment and
      a pressurizing compression amount of air in the electric motor and the reservoir chamber which is compressed by a water pressure applied from the drain port when the pump apparatus is submerged.

2. The plunger pump apparatus as set forth in claim 1, wherein the pump drive shaft having a horizontal axis is connected to a rotational shaft of the electric motor coaxially so as not to rotate relative to the rotational shaft at a vertically intermediate portion of the reservoir chamber, and
   part of the vent passage is formed within a bearing which rotatably supports the rotational shaft on the motor casing.

3. The plunger pump apparatus as set forth in claim 1, wherein a suction chamber is formed between the body and the pump drive shaft so as to store operating fluid raised by the pump,
   an annular seal member which constitutes a seal between the suction chamber and the reservoir chamber is interposed between the pump drive shaft and the body in such a manner as to face the reservoir chamber, and
   the drain port is provided in the body at a position lying above a bottom surface of the reservoir chamber so as to communicate with the reservoir chamber.

4. The plunger pump apparatus as set forth in claim 1, wherein a motor adapter is held between the body and the motor casing so as to form a closed space at least either between the body and the motor adapter or between the motor casing and the motor adapter.

5. The plunger pump apparatus as set forth in claim 1, further comprising a bearing unit fitted on an outer circumference of the eccentric cam portion,
   wherein the plunger sliding contacts with the bearing unit at one end portion thereof, and is fitted in a pump housing in such a manner as to reciprocate in a direction perpendicular to a rotational axis of the pump drive shaft,
   the bearing unit comprises a plurality of ball bearings arranged along with an arrangement direction defined to be parallel to the rotational direction of the pump drive shaft, and the plunger comprises:
- a piston portion slidably fitted in the pump housing, and of which diameter being smaller than a ball distance defined between centers of balls of the ball bearings which are arranged at both ends in the arrangement direction; and
- a bearing abutment portion which is coaxially and continuously connected to the piston portion so as to sliding contact with outer rings of the respective ball bearings,
- wherein an abutment length defined between both ends of the bearing abutment portion in the arrangement direction is set larger than the ball distance.

6. The plunger pump apparatus as set forth in claim 5, wherein the bearing abutment portion is provided to integrally continue to the piston portion.

7. The plunger pump apparatus as set for the in claim 1, further comprising a bearing unit fitted on an outer circumference of the eccentric cam portion,
wherein the plunger sliding contacts with the bearing unit at one end portion thereof, and is fitted in a pump housing in such a manner as to reciprocate in a direction perpendicular to a rotational axis of the pump drive shaft,
the bearing unit comprises;
- a plurality of ball bearings arranged along with an arrangement direction defined to be parallel to the rotational direction of the pump drive shaft; and
- a cylindrical bush fitting to outer rings of the ball bearings to thereby rotate together with the outer rings, the plunger sliding contacts with the bush at one end portion thereof, and has a piston portion is slidably fitted in the pump housing, a diameter of the piston portion is smaller than a ball distance defined between centers of balls of the ball bearings which are arranged at both ends in the arrangement direction.

* * * * *

UNITED STATES PATENT AND TRADEMARK OFFICE
CERTIFICATE OF CORRECTION

PATENT NO. : 7,422,421 B2  Page 1 of 1
APPLICATION NO. : 11/297355
DATED : September 9, 2008
INVENTOR(S) : K. Sakai It is certified that error appears in the above-identified patent and that said Letters Patent is hereby corrected as shown below:

Title Page;
On the cover of the printed patent, at Item (57), Abstract, line 14, after "drain" delete ",".

At column 17, line 17 of the printed patent, "for the" should be --forth--.

Signed and Sealed this

Thirtieth Day of December, 2008

JON W. DUDAS
*Director of the United States Patent and Trademark Office*